(12) United States Patent
Herzig et al.

(10) Patent No.: US 8,222,303 B2
(45) Date of Patent: Jul. 17, 2012

(54) DEFOAMER FORMULATIONS

(75) Inventors: Christian Herzig, Waging (DE); Willibald Burger, Burghausen (DE); Martina Joachimbauer, Haiming (DE); Josef Wimmer, Burghausen (DE)

(73) Assignee: Wacker Chemie AG, Munich (DE)

( * ) Notice: Subject to any disclaimer, the term of this patent is extended or adjusted under 35 U.S.C. 154(b) by 57 days.

(21) Appl. No.: 12/825,746

(22) Filed: Jun. 29, 2010

(65) Prior Publication Data

US 2011/0021688 A1    Jan. 27, 2011

(30) Foreign Application Priority Data

Jul. 27, 2009 (DE) .......................... 10 2009 028 041

(51) Int. Cl.
*B01D 19/04* (2006.01)
*C08G 77/46* (2006.01)

(52) U.S. Cl. ........ 516/118; 516/116; 516/124; 525/477; 528/15; 528/25; 528/31

(58) Field of Classification Search .................. None
See application file for complete search history.

(56) References Cited

U.S. PATENT DOCUMENTS

| | | | |
|---|---|---|---|
| 4,417,068 A | 11/1983 | Kollmeier et al. | |
| 4,855,329 A * | 8/1989 | Blevins et al. ................ | 521/112 |
| 5,271,868 A | 12/1993 | Azechi et al. | |
| 5,523,019 A | 6/1996 | Kim | |
| 5,625,024 A | 4/1997 | Schlitte et al. | |
| 5,804,099 A | 9/1998 | Heilen | |
| 5,830,970 A * | 11/1998 | Cobb et al. ...................... | 516/13 |
| 6,605,183 B1 | 8/2003 | Rautschek et al. | |
| 7,294,653 B2 * | 11/2007 | Zeng .............................. | 516/124 |
| 2003/0013808 A1 | 1/2003 | Tonge | |
| 2004/0106749 A1 | 6/2004 | Burger et al. | |
| 2004/0122113 A1 | 6/2004 | Zeng | |
| 2008/0064806 A1 | 3/2008 | Schneider | |

FOREIGN PATENT DOCUMENTS

| | | |
|---|---|---|
| DE | 056762 A5 | 7/1967 |
| DE | 2925722 A1 | 2/1981 |
| DE | 10255649 A1 | 6/2004 |
| DE | 3133869 C1 | 7/2010 |
| EP | 0341952 A2 | 11/1989 |
| EP | 0663225 A1 | 7/1995 |
| EP | 0777010 A2 | 6/1997 |
| EP | 1076073 A1 | 2/2001 |
| JP | 58058126 A | 4/1983 |
| JP | 2004-181415 A | 7/2004 |
| JP | 2004181415 A | 7/2004 |
| KR | 2003-0094288 A | 12/2003 |
| WO | 9800216 | 1/1998 |

* cited by examiner

*Primary Examiner* — Marc Zimmer
(74) *Attorney, Agent, or Firm* — Brooks Kushman P.C.

(57) ABSTRACT

(A) Siloxane-based antifoams and (B) silicone polyethers prepared by reacting organopolysiloxanes (1) containing 0.05% to 1.6% by weight of Si-bonded hydrogen atoms with unsaturated polyethers (3) of the formulae:

$$CH_2=CR^1—(CH_2)_aO(C_2H_4O)_bR^1 \qquad (Ia)$$

$$CH_2=CR^1—(CH_2)_aO(C_2H_4O)_b(C_3H_6O)_cR^1 \qquad (Ib)$$

$$CH_2=CR^1—(CH_2)_aO(C_3H_6O)_cR^1 \qquad (Ic),$$

where
$R^1$ is a hydrogen or a $C_{1-6}$ hydrocarbon radical,
a is 0 to 16,
b is 1 to 50, and
c is 1 to 50,
wherein the sum b+c is $\geq 10$ and at least two different polyethers (Ia), (Ib) and (Ic) are used, and
optionally further reacting the reaction product
with organopolysiloxanes (2) containing from 0.01% to 0.5% by weight of Si-bonded hydrogen atoms,
wherein the first and second step reactions take place with a hydrosilylation catalyst, and the weight ratio of Si-bonded hydrogen in organopolysiloxane (1) to Si-bonded hydrogen in organopolysiloxane (2) is at least 1.5.

19 Claims, No Drawings

DEFOAMER FORMULATIONS

CROSS-REFERENCE TO RELATED APPLICATIONS

This application claims priority to German Patent Application No. DE 10 2009 028 041.3 filed Jul. 27, 2009.

BACKGROUND OF THE INVENTION

1. Field of the Invention

The invention relates to defoamer formulations comprising (A) siloxane-based antifoams and (B) silicone polyethers, and also to their use for defoaming aqueous media, particularly those arising in pulp production.

2. Background Art

Siloxane-based defoamers are prepared, for example, according to DD-A 056 762 by heating hydrophilic silica in polydimethylsiloxanes. This process is very elaborate, and yet the activity of the defoamers prepared in this way is unsatisfactory. The dispersion of hydrophobicized silica in a polydimethylsiloxane, in accordance for example, with DE-A 29 25 722, is a more rational process, but the activity of the resulting defoamers is likewise deserving of improvement.

Likewise known is the use of modified polyorganosiloxanes in defoamer preparations. Thus, for example, the use of branched siloxane defoamers in combination with polyether-polysiloxane copolymers as defoamers is recommended, for example, for pulp production (EP-A 341 952). In combination with mineral oils as a carrier oil, polyether-polysiloxane copolymers are said to have a positive effect (U.S. Pat. No. 5,523,019). According to WO 98/000216, siloxanes having dimethyl-3-hydroxypropylpolyoxyethylene-polyoxypropylene groups are particularly suitable as surfactants in defoamer formulations.

EP-A 663 225 and EP-A 1076073 claim crosslinked or branched polyorganosiloxanes which carry at least one polyether moiety, as one of the two components of a defoamer formulation. The crosslinking in this case is via alkylene groups, via polydimethylsiloxanes or via polyether groups. As a result of the linkage via Si—C bonds, the products are stable to hydrolysis. These products, however, are generally of high viscosity and are difficult to handle or to further process. In addition, their deposition behavior is high in the operations in which defoaming is to take place.

The process proposed in U.S. Pat. No. 5,625,024 results in linkages via Si—O—C groups, which are unstable to hydrolysis, particularly in acidic or basic media, and hence lose their activity in a foaming aqueous medium.

DE 102 55 649 A describes defoamer formulations in which specially branched polyether-polysiloxane copolymers are added to known antifoams. The effect of such defoamer formulations, however, is attenuated in the presence of water.

DE 31 33 869 C1 (corresponding to U.S. Pat. No. 4,417,068 A) provides a general description of the preparation of silicone polyethers from hydrosiloxanes and alkenyl polyethers in a noble-metal catalyzed hydrosilylation reaction. The examples show the effect of amount of catalyst and catalyst structure on the conversion of the SiH groups. The SiH conversion obtainable in one time interval can be substantially increased, with a given catalyst, only by means of considerably higher concentrations of noble metal, but this is expensive and hence disadvantageous. Also described is how the preparation uses one alkenyl polyether and one hydrosiloxane. Other silicone polyethers require different raw materials.

U.S. Pat. No. 5,271,868 describes antifoam compositions which are composed predominantly of silicone polyethers. The silicone polyethers consist of a linear siloxane backbone having two different kinds of polyether substituents, and also contain 1 to 10 alkylmethylsiloxy units per molecule, where the alkyl chains have 3 to 20 C atoms. The two types of polyether differ in that one type of polyether contains a molar fraction of 10%-30% ethyleneoxy units, while the other type of polyether has a molar fraction of 65%-85% ethyleneoxy units, the remainder in each case being made up of propyleneoxy units. The different polyether substituents are therefore also different in polarity. Silicone polyethers which, in addition to mixed substituents comprising ethyleneoxy and propyleneoxy units, also include substituents composed of only one kind of alkyleneoxy units are not described. The silicone polyethers are prepared by customary hydrosilylation from an H-siloxane and, in this case, two different unsaturated polyethers, the incorporation of the alkyl chains taking place through further addition of olefins to the H-siloxane, either simultaneously or in a separate synthesis step. The fairly narrow definitional range for these polyethers suggests that due to the different polarity of the polyethers, their mutual miscibility is limited as well, and worsens as the differences between them increase. This effect is not conducive to chemical reaction. The additional incorporation of alkyl groups complicates the preparation process further, since the hydrosilylation characteristics of olefins are different from those of allyl polyethers. According to JP 58-58126, which is cited in U.S. Pat. No. 5,271,868, however, such incorporation is necessary in order to provide further improvement in the performance capacity of antifoams.

SUMMARY OF THE INVENTION

An object of the invention was to overcome the disadvantages described above and to provide silicone polyethers that produce more efficient defoaming formulations that are also stable to hydrolysis and are easy to process. These and other objects are achieved by means of the invention, wherein a siloxane-based antifoam is used in conjunction with specific silicone polyethers prepared by hydrosilylation of at least two different alkenyl-functional polyethers.

DETAILED DESCRIPTION OF THE PREFERRED EMBODIMENTS

The invention thus provides defoamer formulations comprising
(A) siloxane-based antifoams and
(B) silicone polyethers preparable by
in a first step, reacting
organopolysiloxanes (1) containing from 0.05% to 1.6% by weight of Si-bonded hydrogen atoms
with unsaturated polyethers (3) selected from the group of the general formulae:

$$CH_2=CR^1-(CH_2)_aO(C_2H_4O)_bR^1 \tag{Ia}$$

$$CH_2=CR^1-(CH_2)_aO(C_2H_4O)_b(C_3H_6O)_cR^1 \tag{Ib}$$

$$CH_2=CR^1-(CH_2)_aO(C_3H_6O)_cR^1 \tag{Ic},$$

where
$R^1$ is a hydrogen atom or a hydrocarbon radical having 1 to 6 carbon atoms, a is 0 or an integer from 1 to 16, preferably 1 to 4,
b is an integer from 1 to 50, preferably 3 to 20, and
c is an integer from 1 to 50, preferably 3 to 40,
with the proviso that the sum of b+c is at least 10, preferably at least 20, and
that a mixture of at least two different kinds of polyethers from the group of the formulae (Ia), (Ib) and (Ic) is used,
and optionally in a second step, further reacting
the reaction product from (1) and (3)
with organopolysiloxanes (2) containing from 0.01% to 0.5% by weight of Si-bonded hydrogen atoms,
with the proviso that the reactions in the first and second steps are carried out in the presence of catalysts (4) which promote the addition of Si-bonded hydrogen to aliphatic double bonds, and
that the ratio of the weight concentration of Si-bonded hydrogen in organopolysiloxane (1) to the weight concentration of Si-bonded hydrogen in organopolysiloxane (2) is at least 1.5, preferably at least 2.0.

The invention additionally provides silicone polyethers (B) preparable by
in a first step, reacting
organopolysiloxanes (1) containing from 0.05% to 1.6% by weight of Si-bonded hydrogen atoms
with unsaturated polyethers (3) selected from the group of the general formulae:

  (Ia)

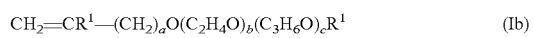  (Ib)

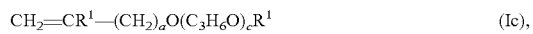  (Ic), where
$R^1$ is a hydrogen atom or a hydrocarbon radical having 1 to 6 carbon atoms,
a is 0 or an integer from 1 to 16, preferably 1 to 4,
b is an integer from 1 to 50, preferably 3 to 20, and
c is an integer from 1 to 50, preferably 3 to 40,
with the proviso that the sum of b+c is at least 10, preferably at least 20, and
that a mixture of at least two different kinds of polyethers from the group of the formulae (Ia), (Ib) and (Ic) is used,
and optionally in a second step, further reacting
the reaction product from (1) and (3)
with organopolysiloxanes (2) containing from 0.01% to 0.5% by weight of Si-bonded hydrogen atoms,
with the proviso that the reactions in the first and second steps are carried out in the presence of catalysts (4) which promote the addition of Si-bonded hydrogen to aliphatic double bonds, and
that the ratio of the weight concentration of Si-bonded hydrogen in organopolysiloxane (1) to the weight concentration of Si-bonded hydrogen in organopolysiloxane (2) is at least 1.5, preferably at least 2.0.

Preferably, in the process of the invention, the ratio of the weight concentration of Si-bonded hydrogen in organopolysiloxane (1) to the weight concentration of Si-bonded hydrogen in organopolysiloxane (2) is not more than 20, more preferably not more than 10.

Where the preparation process is carried out in 2 steps, the first step of the process of the invention preferably uses organopolysiloxanes (1) in amounts of 0.2 to 0.7, more preferably 0.3 to 0.6, gram atom of Si-bonded hydrogen per mole of aliphatic double bond in the polyethers (3).

The second step of the process of the invention preferably uses organopolysiloxanes (2) in amounts of 0.1 to 0.6, more preferably 0.2 to 0.5, gram atom of Si-bonded hydrogen per mole of aliphatic double bond in the polyethers (3).

The process of the invention preferably uses organopolysiloxanes (1) and (2) in total amounts of 0.5 to 1.0, more preferably 0.6 to 0.8, gram atom of Si-bonded hydrogen per mole of aliphatic double bond in the polyethers (3).

A preferred procedure is the preparation of the silicone polyethers in one process step.

As organopolysiloxanes (1) it is preferred to use linear, cyclic or branched organopolysiloxanes comprising units of the general formula

  (II)

where
R may be identical or different and denotes a monovalent hydrocarbon radical which has 1 to 18 carbon atoms and is free from aliphatic carbon-carbon multiple bonds,
e is 0, 1, 2 or 3,
f is 0, 1 or 2
and the sum of e+f is $\leq 3$,
with the proviso that at least 2 Si-bonded hydrogen atoms are present.

Preferred organopolysiloxanes (1) used are those of the general formula

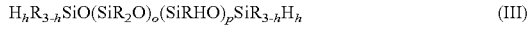  (III)

where R has the definition stated for it above,
h is 0, 1 or 2, preferably 0 or 1,
o is 0 or an integer from 1 to 1000, preferably 10 to 200, more preferably 10 to 80, and
p is 0 or an integer from 1 to 40, preferably 2 to 20,
with the proviso that at least 2 Si-bonded hydrogen atoms are present.

In the context of this invention, formula (III) is to be understood to mean that o units —(SiR$_2$O)— and p units —(SiRHO)— may be distributed in the organopolysiloxane molecule in any desired way, for example as a block or randomly.

Examples of organopolysiloxanes (1) of this kind are, in particular, copolymers comprising trimethylsiloxane, dimethylsiloxane and methylhydrosiloxane units, copolymers comprising dimethylhydrosiloxane, methylhydrosiloxane, dimethylsiloxane and trimethylsiloxane units, copolymers comprising trimethylsiloxane, dimethylhydrosiloxane and methylhydrosiloxane units, copolymers comprising methylhydrosiloxane and trimethylsiloxane units, copolymers comprising methylhydrosiloxane, diphenylsiloxane and trimethylsiloxane units, copolymers comprising methylhydrosiloxane, dimethylhydrosiloxane and diphenylsiloxane units, copolymers comprising methylhydrosiloxane, phenylmethylsiloxane, trimethylsiloxane and/or dimethylhydrosiloxane units, copolymers comprising methylhydrosiloxane, dimethylsiloxane, diphenylsiloxane, trimethylsiloxane and/or dimethylhydrosiloxane units, and copolymers comprising dimethylhydrosiloxane, trimethylsiloxane, phenylhydrosiloxane, dimethylsiloxane and/or phenylmethylsiloxane units.

The organopolysiloxanes (1) preferably possess an average viscosity of 5 to 5000 mm$^2$/s at 25° C., more preferably 20 to 500 mm$^2$/s at 25° C.

As organopolysiloxanes (2) it is preferred to use linear, cyclic or branched organopolysiloxanes comprising units of the general formula $$R_kH_lSiO_{\frac{4-k-l}{2}}, \quad (IV)$$

where
R may be identical or different and denotes an SiC-bonded monovalent hydrocarbon radical which has 1 to 18 carbon atoms and is free from aliphatic carbon-carbon multiple bonds,
k is 0, 1, 2 or 3,
l is 0, 1 or 2
and the sum of k+l is ≦3,
with the proviso that at least 2 Si-bonded hydrogen atoms are present.

Preferred organopolysiloxanes (2) used are those of the general formula $$H_gR_{3-g}SiO(SiR_2O)_r(SiRHO)_sSiR_{3-g}H_g \quad (V)$$

where R has the definition stated for it above,
g is 0, 1 or 2, preferably 0 or 1,
r is 0 or an integer from 10 to 1000, preferably 20 to 200, and
s is 0 or an integer from 10 to 100, preferably 20 to 50,
with the proviso that at least 2 Si-bonded hydrogen atoms are present.

In the context of this invention, formula (V) is to be understood to mean that r units —(SiR₂O)— and s units —(SiRHO)— may be distributed in the organopolysiloxane molecule in any desired way, for example as a block or randomly.

Examples of organopolysiloxanes (1) are valid in full for organopolysiloxanes (2) as well. The organopolysiloxanes (2) preferably possess an average viscosity of 50 to 5000 mm²/s at 25° C., more preferably 50 to 500 mm²/s at 25° C.

The ratio of the viscosities of organopolysiloxanes (2) to organopolysiloxanes (1) is preferably at least 2.0, more preferably at least 3.0, and most preferably at least 5.0. The viscosity ratio of organopolysiloxanes (2) to organopolysiloxanes (1) is preferably not more than 1000, more preferably not more than 100.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, the α- and the β-phenylethyl radicals.

Preferably R is a methyl radical. More preferably at least 99 mol %, and most preferably 100 mol %, of all the radicals R are methyl radicals. With particular preference the organopolysiloxanes (1) and (2), in addition to Si-bonded hydrogen atoms, contain 99 mol %, more particularly 100 mol %, of methyl radicals as SiC-bonded hydrocarbon radicals R.

Examples of hydrocarbon radicals R¹ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, and hexyl radicals such as the n-hexyl and the isohexyl radicals. Preference as radical R¹ is given to a hydrogen atom.

Polyethers (3) used are at least two kinds of polyethers of the formulae (Ia) to (Ic).

It is possible, therefore, to use the polyethers (Ia) and (Ib), (Ia) and (Ic), and (Ib) and (Ic) in a mixture with one another for the reaction with organopolysiloxanes (1), or else the combination of (Ia), (Ib) and (Ic). In other words, polyethers with different polarities are always used with one another. While (Ia) and (Ic) are homopolymers, (Ib) is a copolymer whose molar fraction of ethyleneoxy units (EO units) is preferably in the range from about 1 to about 99 mol %, more preferably in the range from about 4 to 80 mol % and most preferably in the range from about 10 to 65 mol %, the remainder being made up of propyleneoxy units (PO units).

In the defoamer formulations it is preferred to use silicone polyethers (B) which are prepared by the reaction of a mixture of polyethers of the formulae (Ib) and (Ic) with organopolysiloxanes (1).

The fraction of ethyleneoxy units from the polyethers of the formulae (Ib) and (Ic), relative to the total number of alkyleneoxy units used, is preferably not more than 50 mol %, more preferably not more than 40 mol % and most preferably not more than 30 mol %. One particularly preferred range is from 10 to 30 mol %.

One particular advantage of the method of preparation for the silicone polyethers (B) of the invention is the possibility for precise and stepless adjustment of their polarity, in other words of the ratio of organosiloxy, ethyleneoxy and propyleneoxy constituents, allowing a wide range of different products to be covered with just a few raw materials, through variation in the proportions of the polyethers of the formulae (Ia), (Ib) and (Ic).

In formulae (Ia), (Ib) and (Ic) a is preferably 1, and it is preferred to use allyl polyethers.

Examples of polyethers of the formula (Ia) are $CH_2=CH-CH_2O(C_2H_4O)_5H$, $CH_2=CH-CH_2O(C_2H_4O)_8H$, $CH_2=CH-CH_2O(C_2H_4O)_{12}CH_3$.

Examples of polyethers of the formula (Ib) are $CH_2=CH-CH_2O(C_2H_4O)_7(C_3H_6O)_{12}H$, $CH_2=CH-CH_2O(C_2H_4O)_{10}(C_3H_6O)_6H$, $CH_2=CH-CH_2O(C_2H_4O)_{20}(C_3H_6O)_{20}H$, $CH_2=CH-CH_2O(C_2H_4O)_{12}(C_3H_6O)_{32}H$, $CH_2=CH-CH_2O(C_2H_4O)_{12}(C_3H_6O)_8CH_3$.

Examples of polyethers of the formula (Ic) are $CH_2=CH-CH_2O(C_3H_6O)_3H$ $CH_2=CH-CH_2O(C_3H_6O)_{18}C(=O)CH_3$ $CH_2=CH-CH_2O(C_3H_6O)_{30}H$.

As catalysts (4) which promote the addition of Si-bonded hydrogen to aliphatic double bond it is possible in the process of the invention to use any catalyst which promotes the addition of Si-bonded hydrogen to an aliphatic double bond. The catalysts preferably comprise a metal from the group of the platinum metals, or a compound or a complex from the group of the platinum metals. Examples of such catalysts are metallic and finely divided platinum, which may be present on supports, such as silicon dioxide, aluminum oxide or activated carbon, compounds or complexes of platinum, such as platinum halides, e.g. $PtCl_4$, $H_2PtCl_6 \cdot 6H_2O$, Na2PtCl$_4$.4H2O, platinum-olefin complexes, platinum-alcohol complexes, platinum-alkoxide complexes, platinum-ether complexes, platinum-aldehyde complexes, platinum-ketone complexes, including reaction products of H2PtCl$_6$.6H2O and cyclohexanone, platinum-vinylsiloxane complexes, such as platinum-1,3-divinyl-1,1,3,3-tetramethyl-disiloxane complexes with or without detectable inorganically bonded halogen, bis(gamma-picoline)platinum dichloride, trimethylenedipyridineplatinum dichloride, dicyclopentadieneplatinum dichloride, dimethylsulfoxideethyleneplatinum(II) dichloride, cycloo ctadiene-platinum dichloride, norbornadiene-platinum dichloride, gamma-picoline-platinum dichloride, cyclopentadiene-platinum dichloride, and also reaction products of platinum tetrachloride with olefin and primary amine or secondary amine, or primary and secondary amine, such as the reaction product of platinum tetrachloride in solution in 1-octene with sec-butylamine, or ammonium-platinum complexes.

The catalyst (4) in the process of the invention is preferably used in amounts of 1 to 50 ppm by weight (parts by weight per million parts by weight), more preferably in amounts of 5 to 20 ppm by weight, calculated in each case as elemental platinum and based on the total weight of the components (1), (2) and (3).

In the process of the invention the catalyst (4) is preferably added to polyether (3) prior to the metered addition of the organopolysiloxanes (1) and (2). It is preferred to include part of the amount of the catalyst in the initial charge in the first step, and to add the remainder of the catalyst in the second step, if working in two steps.

The process of the invention is preferably carried out at a temperature of 60 to 120° C., more preferably at 80 to 120° C. The process of the invention is preferably carried out under the pressure of the surrounding atmosphere, in other words approximately at 1020 hPa, although it may also be carried out at higher or lower pressures.

In the process of the invention it is possible for solvents to be used. Examples of solvents are toluene, xylene, isopropanol and n-butanol. If solvents are used, they are preferably employed in amounts of 5% to 20% by weight, based on the reaction mixture. The use of solvents, however, is not preferred.

Silicone polyethers (B) obtained by the process of the invention are preferably organopolysiloxanes which comprise polyether radicals A selected from the group of the general formulae

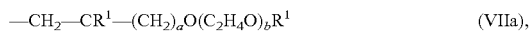 (VIIa),

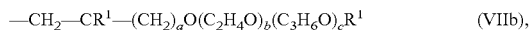 (VIIb),

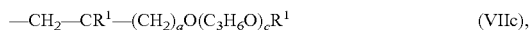 (VIIc), where
$R^1$, a, b and c have the definition stated for them above,
with the proviso that at least 2 different kinds of polyether radicals A from the group of the formulae (VIIa), (VIIb) and (VIIc) are present.

As silicone polyethers (B) obtained by the process of the invention, preference is given to linear, cyclic or branched organopolysiloxanes comprising units of the general formula

 (VI)

where

A is a polyether radical selected from the group of the general formulae

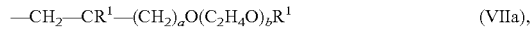 (VIIa),

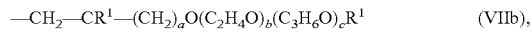 (VIIb),

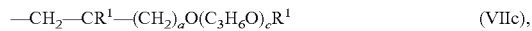 (VIIc),

R may be identical or different and denotes an SiC-bonded, monovalent hydrocarbon radical which has 1 to 18 carbon atoms and is free from aliphatic carbon-carbon multiple bonds,
$R^1$, a, b and c have the definition stated for them above,
x is 0, 1 or 2,
y is 0, 1, 2 or 3,
and the sum of x+y is $\leq 3$,
with the proviso that at least 2 different kinds of polyether radicals A from the group of the formulae (VIIa), (VIIb) and (VIIc) are present.

Silicone polyethers (B) obtained by the process of the invention are very preferably those of the general formula

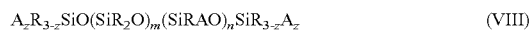 (VIII)

where
A and R have the definition stated for them above,
z is 0, 1 or 2, preferably 0 or 1,
m is 0 or an integer from 1 to 1000, preferably 10 to 200, and
n is 0 or an integer from 1 to 50, preferably 2 to 20,
with the proviso that at least 2 different kinds of polyether radicals A from the group of the formulae (VIIa), (VIIb) and (VIIc) are present.

In the context of this invention, formula (VIII) is to be understood to mean that m units —(SiR$_2$O)— and n units —(SiRAO)— may be distributed in the organopolysiloxane molecule in any desired way, for example as a block or randomly.

Silicone polyethers (B) obtained are preferably those which comprise two different polyether radicals A of the general formulae

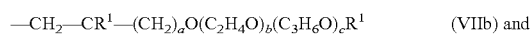 (VIIb) and

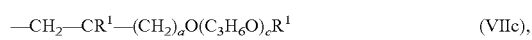 (VIIc), where
$R^1$, a, b and c have the definition stated for them above.

Silicone polyethers (B) preferably obtained are those which comprise two different polyether radicals A of the general formulae (VIIb) and (VIIc), the fraction of ethyleneoxy units in the polyether radicals of the formulae (VIIb) and (VIIc), relative to the total number of alkyleneoxy units, preferably being not more than 50 mol %, more preferably not more than 40 mol % and most preferably not more than 30 mol %.

The silicone polyethers obtained by the process of the invention preferably possess a viscosity of 50 to 100,000 mPa·s at 25° C., more preferably 100 to 20,000 mPa·s at 25° C.

The defoamer formulations of the invention preferably comprise
(A) 1% to 90% by weight of siloxane-based antifoams,
(B) 0.1% to 70% by weight of the silicone polyether of the invention,
(C) 0% to 20%, preferably 2% to 20%, by weight of emulsifiers,
(D) 0 to 97% by weight of water,
based in each case on the total weight of the defoamer formulations, and optionally
(E) preservatives, thickeners and further additives.

As siloxane-based antifoam (A) (also referred to below as siloxane defoamer), it is usual to use a mixture of silica and polyorganosiloxanes, the mixture preferably comprising (aa) 1% to 15% by weight of an in situ hydrophobicized, precipitated and/or fumed silica having a BET surface area of greater than 50 g/m², and/or of a pretreated, hydrophobic, precipitated and/or fumed silica having a BET surface area of greater than 50 g/m², (ab) 20% to 99% by weight of one or more polyorganosiloxanes comprising units of the general formula

$$R^8_e(R^9O)_d SiO_{(4-e-d)/2} \quad \text{(IX)},$$

in which $R^8$ may be identical or different and denotes a monovalent, substituted and/or unsubstituted, saturated and/or unsaturated hydrocarbon radical having 1 to 30 carbon atoms per radical, $R^9$ may be identical or different and denotes a hydrogen atom or a monovalent, substituted and/or unsubstituted, saturated and/or unsaturated hydrocarbon radical having 1 to 30 carbon atoms per radical, d is 0, 1, 2 or 3, with d being on average a value of less than 0.5, e is 0, 1, 2 or 3, with the proviso that the sum (d+e) is <3 and has a value on average of 1.8 to 2.4, (ac) 0% to 10% by weight of a silicone resin which is composed substantially of units of the general formula $R_3SiO_{1/2}$ and $SiO_{4/2}$, where R has the definition indicated for it above, and (ad) 0% to 80% by weight of an organic compound having a boiling point of greater than 100° C., selected from mineral oils, natural oils, isoparaffins, polyisobutylenes, residues from the oxo process for alcohol synthesis, esters of low molecular mass synthetic carboxylic acids, ethers of low molecular mass alcohols, phthalates, esters of phosphoric acid, polyoxyalkylenes such as, for example, polypropylene glycols or ethylene oxide-propylene oxide copolymers, and esters and ethers of polyoxyalkylenes, the % by weight being based in each case on the total weight of the antifoam.

The in situ hydrophobicization of the silica (aa) can be accomplished by heating the silica in dispersion in the polyorganosiloxane (ab) for a number of hours at temperatures from 100 to 200° C. This reaction may be assisted by the addition of catalysts, such as KOH, and of hydrophobicizing agents such as short-chain, OH-terminated polydimethylsiloxanes, silanes, silazanes or silicone resins. As an alternative it is possible to employ pretreated, hydrophobicized silicas, or else a combination of in situ hydrophobicized silicas with pretreated hydrophobicized silicas.

Examples of radicals $R^8$ in the general formula (II) are unsubstituted, branched or unbranched alkyl radicals such as methyl, ethyl, propyl, isopropyl, hexyl, 2-ethylhexyl, octyl or dodecyl radicals; substituted alkyl radicals such as trifluoropropyl, cyanoethyl, glycidyloxypropyl, polyalkylene glycol propyl, aminopropyl or aminoethylaminopropyl radicals; unsaturated radicals such as vinyl, methacryloyloxypropyl or allyl radicals; and aromatic radicals such as phenyl, tolyl, xylyl, naphthyl, anthracyl or benzyl radicals. Particularly preferred radicals $R^8$ are the methyl or phenyl radicals, it being particularly preferred for more than 80 mol % of the radicals $R^8$ to be methyl radicals.

Examples of radicals $R^9$ in the general formula (II) are unsubstituted, branched or unbranched alkyl radicals such as methyl, ethyl, propyl, isopropyl, hexyl, 2-ethylhexyl, octyl or dodecyl radicals; substituted alkyl radicals such as trifluoropropyl, cyanoethyl, glycidyloxypropyl, polyalkylene glycol propyl, aminopropyl or aminoethylaminopropyl radicals; unsaturated radicals such as vinyl, methacryloyloxypropyl or allyl radicals; and aromatic radicals such as phenyl, tolyl, xylyl, naphthyl, anthracyl or benzyl radicals.

Examples of compounds of the formula (IX) are polydimethyl-siloxanes having viscosities of 100 to 1,000,000 mPa·s at 25° C. These polydimethylsiloxanes may be branched as a result, for example, of the incorporation of $CH_3SiO_{3/2}$ or $SiO_{4/2}$ units. These branched or partly crosslinked siloxanes then have viscoelastic properties.

Branched viscoelastic polyorganosiloxanes of this kind may be obtained, for example, by reacting the product of hydrolysis of dimethyl-dichlorosilane, or hydroxy-terminated polydimethylsiloxanes, with a trimethylsilyl-terminated polydimethylsiloxane and with a compound selected from a silane having at least three hydrolyzable groups, such as tetraethoxysilane, methyltrimethoxysilane or methyltriacetoxysilane, or a silicone resin constructed substantially from $(CH_3)_3SiO_{1/2}$ units and $SiO_2$ units in a ratio of 2:1 to 1:2, in the presence of a catalyst.

Another variant for preparing branched viscoelastic polyorganosiloxanes is the reaction of an organosiloxane $X^1$ having randomly distributed, on average less than 2 functional groups per molecule with an organosiloxane $X^2$ having randomly distributed, on average more than 2 functional groups per molecule, there being in each case only one kind of functional group per siloxane $X^1$ or $X^2$, in the presence of a catalyst that promotes hydrosilylations, such as platinum or compounds of platinum, for example.

The siloxane-based antifoam may further comprise 0.1% to 10% by weight, preferably 0.5% to 5% by weight, of at least one polyorganosiloxane (ab') of the general formula (IX), in which $R^8$ is a methyl radical and $R^9$ is a linear and/or branched hydrocarbon radical having at least 6 carbon atoms, d adopts a value of 0.005 to 0.5 and the sum (d+e) adopts a value of 1.9 to 2.1. Products of this kind are available, for example, through alkali-catalyzed condensation of silanol-terminated polydimethylsiloxanes with a viscosity of 50 to 50,000 mPa·s at 25° C. and aliphatic alcohols having more than 6 carbon atoms, such as isotridecyl alcohol, n-octanol, stearyl alcohol, 4-ethylhexadecanol or eicosanol.

In the defoamer formulations of the invention there may be further known additives or adjuvants present, for example those customary in defoamer formulations, examples being further fillers such as aluminum oxide, metal soaps, hydrophobicized finely ground quartz, or finely divided hydrophobic polyurethanes. Also possible, however, is the addition of substances which act as defoamer oils, such as mineral oils, liquid paraffins, fatty acid esters, fatty alcohols, polyoxyalkylenes such as polypropylene glycols or ethylene oxide-propylene oxide copolymers, esters and ethers of polyoxyalkylenes, and waxes, in amounts of 1% to 99% by weight, based on the total weight of the formulation. It is also possible to add compounds which are known thickeners, such as polyacrylic acid, polyacrylates, cellulose ethers, such as carboxymethylcellulose and hydroxyethylcellulose, natural gums, such as xanthan gum, and polyurethanes.

The defoamer formulation of the invention is prepared by known processes, as for example using high shearing forces in colloid mills or rotor-stator homogenizers. This mixing operation may take place under reduced pressure in order to prevent the incorporation of air, which is present in highly disperse fillers.

The defoamer formulations of the invention are employed preferably in oil-in-water emulsions (O/W emulsions). The specific silicone polyethers that are used in the defoamer formulations of the invention have surfactant properties and are therefore also suitable as emulsifiers for the formation of oil-in-water emulsions, starting from antifoams based on siloxanes. The defoamer formulations, when used as emulsions, may also be admixed with additional organic emulsifiers which are able to form O/W emulsions on the basis of siloxanes.

The silicone polyethers (B) can be emulsified together with the antifoam (A), or, after the preparation of an emulsion from the antifoam (A), the silicone polyethers (B) may simply be added to the antifoam emulsion directly or in the form of an emulsion, in order to obtain an improvement in effect.

The defoamer formulations of the invention in the form of O/W emulsions preferably comprise
(A) 2 to 50% by weight of siloxane-based antifoam,
(B) 0.1% to 40%, more particularly 0.3% to 40%, by weight of the silicone polyether of the invention,
(C) 2% to 20% by weight of an emulsifier and
(D) 50% to 95% by weight of water,
based in each case on the total weight of the defoamer formulations, and optionally
(E) preservatives, thickeners and further additions.

The emulsifiers that are needed for preparing the emulsions may be anionic, cationic or nonionic and are known to those skilled in the art for the preparation of stable silicone emulsions. It is preferred to use emulsifier mixtures, in which case there should be at least one nonionic emulsifier, for example, sorbitan fatty acid esters, ethoxylated sorbitan fatty acid esters, ethoxylated fatty acids, ethoxylated linear or branched alcohols having 10 to 20 carbon atoms and/or glycerol esters.

Technologies for the preparation of silicone emulsions are known. They are typically prepared by simply stirring together all of the constituents and then homogenizing them using rotor-stator homogenizers, colloid mills or high-pressure homogenizers.

The defoamer formulations of the invention can be employed wherever operations are subject to disruptive foaming which is to be lessened or eliminated entirely. Such applications are, for example, in laundry detergents and cleaning detergents, the control of foam in wastewater plants, textile dyeing processes, the scrubbing of natural gas, in dispersions, and in hydrocarbons.

The defoamer formulations of the invention can be used to outstanding effect, more particularly, for defoaming aqueous media arising in pulp production.

Working Examples

All of the parts and percentages below (unless otherwise indicated) are based on weight. The viscosities relate to 25° C.
(A) Preparation of the Siloxane Defoamers
A1: 94 parts of polydimethylsiloxane with a viscosity of 12,500 mm$^2$/s and 6 parts of a hydrophilic silica were homogenized three times using a colloid mill (0.6 mm slot). The silica was hydrophobicized in situ by heating of the mixture at 190° C. for 10 hours.
A2: 400 parts of a hydroxy-terminated polydimethylsiloxane with a viscosity of 65 mm$^2$/s, 40 parts of trimethylsiloxy-terminated polydimethylsiloxane with a viscosity of 40 mm$^2$/s, 4 parts of methyltrimethoxysilane and 1 part of a 0.5% phosphorus nitride chloride catalyst were heated to 100° C. Over the course of 20 minutes the pressure was lowered to 35 mbar. Thereafter the catalyst was neutralized with 0.03 part of triisooctylamine. The resulting polyorganosiloxane had a viscosity of 19,000 mm$^2$/s. Incorporated into 95 parts of this oil were 5 parts of a pretreated hydrophobic silica, and the mixture was homogenized using a colloid mill.
A3: A mixture of 89.3 parts of a trimethylsiloxy-terminated polydimethylsiloxane with a viscosity of 5000 mm$^2$/s, 5 parts of a fumed hydrophilic silica having a BET surface area of 300 m$^2$/g, 0.7 part of a 20% strength methanolic KOH, 2.5 parts of a silicone resin composed of 40 mol % of trimethylsiloxy units and 60 mol % of SiO$_{4/2}$ units, and 2.5 parts of a siloxane prepared by condensing eicosanol with a hydroxy-terminated polydimethylsiloxane with a viscosity of 65 mm$^2$/s was heated at 150° C. for 2 h. After cooling, the mixture was homogenized using a colloid mill.
(B) Preparation of the Silicone Polyethers
Preparation of Inventive Silicone Polyether Polymer 1

71.2 g of an allyl polyether having an iodine number of 14.4 and an EO/PO ratio of 0.936 (corresponding to 40 meq of C=C) are mixed homogeneously with 76.6 g of a pure allyl polypropoxylate having an iodine number of 15.6 (corresponding to 47 meq of C=C). The fraction of the EO groups as a proportion of the total number of alkyleneoxy groups used is 25 mol %. The mixture is admixed with 60 mg of limonene oxide and 0.27 g of hexachloroplatinic acid solution in isopropanol (corresponding to 1.0 mg of Pt) and is heated to 85° C. Over the course of half an hour, 37.9 g of a polysiloxane comprising hydrodimethylsiloxy, hydromethylsiloxy and dimethylsiloxy units, with 0.165% of active hydrogen and with a viscosity of 148 mm$^2$/s, are metered in. 10 minutes after the end of metering, the batch, which to start with is hazy, becomes clear, and after 60 minutes SiH is no longer detectable in the IR spectrum. The clear product has a viscosity of 2165 mm$^2$/s at 25° C.

Comparative Experiment 1

Polymer 2

Polymer 2 used was a commercial unbranched polyether-polysiloxane copolymer having a viscosity of 1100 mPa·s at 25° C. and a cloud point of >25° C. The chain length of the pendant polyether-polysiloxane copolymer is about 50 Si units, the ratio of the dimethylsiloxy(D) to methylpolyether-siloxy (D') units is about 7:1, and the mol % fraction of the EO fraction is 74%, and that of PO is 26%.

Comparative Experiment 2 According to U.S. Pat. No. 5,271,868

Polymer 3

119.7 g of an allyl polyether with an iodine number of 16.0 and an EO fraction of 19 mol % (corresponding to 80 meq of C=C) are mixed homogeneously with 30.4 g of an allyl polyether having an iodine number of 33.4 and an EO fraction of 80 mol % (corresponding to 40 meq of C=C). The fraction of the EO groups as a proportion of the total number of alkyleneoxy groups $G^2$ and $G^3$ used is 33 mol %.

Metered into this mixture additionally are 4.5 g of 1-octene and also 60 mg of limonene oxide and 0.27 g of hexachloroplatinic acid solution in isopropanol (corresponding to 1.0 mg of Pt). After heating has taken place to 85° C., 34.9 g of a polysiloxane comprising hydromethylsiloxy, dimethylsiloxy and trimethylsiloxy units, with 0.316% of active hydrogen and with a viscosity of 46 mm$^2$/s, are metered in. After 2 hours, SiH is no longer detectable in the IR spectrum. The clear product has a viscosity at 25° C. of 980 mm$^2$/s. The ratio $G^2/G^3$ is 2.0, and the characteristic indices of an average silicone polyether molecule are m=5, n=2.5 and q=3.5. (cf. U.S. Pat. No. 5,271,868)

(C) Preparation and Testing of Defoamer Formulations
Testing of Activity (Black Liquor Test):

400 ml of black liquor (hardwood from the processing of birch, from UPM-Kymmene Oy Kymi, Kuusankoski) are heated to 80° C. over the course of 15 minutes and then transferred to a 1 l measuring cylinder heated at 80° C. by means of a thermostat. Following addition of 5 mg of organosilicon polymers (the sum of silicone defoamer A and silicone polymer B) in the form of the prepared defoamer formulation, the black liquor was pumped in circulation at a rate of 1.6 l/min; whenever (a total of 2 times) a height of 5 cm of foam was reached in the measuring cylinder, 5 mg of silicone were added immediately (a total of 15 mg of silicone). A measurement was made of the time t between the start of the test and the time after the final addition when the foam had risen again to 5 cm.

The longer this time t, the more active the defoamer.

Examples 1 to 3 (C11, C12, C13) and Comparative Experiments 1 to 6 (V11, V12 and V13 with Polymer 2, and V14, V15 and V16 with Polymer 3)

The inventive defoamer formulations C11, C12 and C13 and the defoamer formulations V11, V12 and V13 and also V14, V15 and V16 of comparative experiments were prepared by simple mixing of 90 parts of the silicone defoamer indicated in the table and 10 parts of the silicone polyether indicated in the table, using a laboratory dissolver. For testing, a mixture of 40 parts of this defoamer formulation and 60 parts of a mixture of aliphatic hydrocarbons with a viscosity of 3 mm$^2$/s and a flash point>100° C. was prepared using a laboratory dissolver at 1000 min$^{-1}$.

The results of the activity testing are summarized in the table.

Examples 4 to 6 (C21, C22 and C23) and Comparative Experiments 4 to 6 (V21, V22 and V23 with Polymer 2)

The inventive defoamer formulations C21, C22 and C23 and the defoamer formulations V21, V22 and V23 of comparative experiments were prepared by mixing 20 parts of the silicone defoamer indicated in the table, 5 parts of sorbitan monostearate, 5 parts of polyoxyethylene(40) stearate, and 2 parts of the silicone polyether indicated in the table, at 70° C. 10 parts of a 1% strength solution of xanthan gum, preserved with 0.5% of formaldehyde, were stirred in using a surface stirrer at 600 min$^{-1}$. Over the course of 3 minutes, 55 parts of water were added in portions, followed by stirring at 1000 min$^{-1}$ for 15 minutes.

The results of the activity testing are summarized in the table.

Examples 7 to 9 (C31, C32 and C33) and Comparative Experiments 7 and 9 (V31, V32 and V33 with Polymer 2)

The inventive defoamer formulations C31, C32 and C33 and also the defoamer formulations V31, V32 and V33 from comparative experiments were prepared by mixing 20 parts of the siloxane defoamer indicated in the table, 4 parts of polyoxyethylene(4) stearate and 2 parts of polyoxyethylene (40) stearate, at 70° C. Over the course of 10 minutes, 69 parts of water were added in portions. Finally, 2 parts of the silicone polyether indicated in the table were introduced into the resulting emulsions, followed by stirring at 1000 min$^{-1}$ for 15 minutes.

The results of the activity testing are summarized in the table.

TABLE

Formula and test results of the defoamer formulations

| Example or comparative experiment | Silicone defoamer | Polysiloxanecopolymer | Black liquor test, t in s |
|---|---|---|---|
| C11 | A1 | Polymer 1 | 650 |
| C12 | A2 | Polymer 1 | 793 |
| C13 | A3 | Polymer 1 | 840 |
| V11 not inventive | A1 | Polymer 2 | 576 |
| V12 not inventive | A2 | Polymer 2 | 625 |
| V13 not inventive | A3 | Polymer 2 | 758 |
| V14 not inventive | A1 | Polymer 3 | 598 |
| V15 not inventive | A2 | Polymer 3 | 765 |
| V16 not inventive | A3 | Polymer 3 | 659 |
| C21 | A1 | Polymer 1 | 890 |
| C22 | A2 | Polymer 1 | 954 |
| C23 | A3 | Polymer 1 | 1012 |
| V21 not inventive | A1 | Polymer 2 | 812 |
| V22 not inventive | A2 | Polymer 2 | 879 |
| V23 not inventive | A3 | Polymer 2 | 924 |
| C31 | A1 | Polymer 1 | 865 |
| C32 | A2 | Polymer 1 | 957 |
| C33 | A3 | Polymer 1 | 1048 |
| V31 not inventive | A1 | Polymer 2 | 830 |
| V32 not inventive | A2 | Polymer 2 | 893 |
| V33 not inventive | A3 | Polymer 2 | 969 |

The significantly improved activity of the defoamer formulations of the invention as compared with the prior art (comparative experiments) is obvious on the basis of the substantially higher values for t.

Repetition of the defoamer test in a softwood (pine) black liquor confirmed the outstanding activity of the defoamer formulations of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Defoamer formulations comprising
   (A) siloxane-based antifoams and
   (B) silicone polyethers prepared by
      in a first step,
      reacting organopolysiloxanes (1) containing from 0.05% to 1.6% by weight of Si-bonded hydrogen atoms
      with unsaturated polyethers (3) of the formulae:

$$CH_2\!=\!CR^1\!-\!(CH_2)_aO(C_2H_4O)_bR^1 \qquad (Ia)$$

$$CH_2\!=\!CR^1\!-\!(CH_2)_aO(C_2H_4O)_b(C_3H_6O)_cR^1 \qquad (Ib)$$

$$CH_2\!=\!CR^1\!-\!(CH_2)_aO(C_3H_6O)_cR^1 \qquad (Ic),$$

where
$R^1$ is a hydrogen atom or a hydrocarbon radical having 1 to 6 carbon atoms,
a is 0 or an integer from 1 to 16,
b is an integer from 1 to 50, and
c is an integer from 1 to 50,
with the proviso that the sum of b+c is at least 10 and that a mixture of at least two different kinds of polyethers from the group of the formulae (Ia), (Ib) and (Ic) is used, and with the further proviso that the reaction takes place with a ratio of about 0.2 to 0.7 gram atoms of Si-bonded hydrogen per mol of aliphatic double bonds in the unsaturated polyethers, and in a second step, further reacting the reaction product from (1) and (3) with organopolysiloxanes (2) containing from 0.01% to 0.5% by weight of Si-bonded hydrogen atoms, with the proviso that the reactions in the first and second steps are carried out in the presence of catalysts (4) which promote the addition of Si-bonded hydrogen to aliphatic double bonds, and that the ratio of the weight concentration of Si-bonded hydrogen in organopolysiloxane (1) to the weight concentration of Si-bonded hydrogen in organopolysiloxane (2) is at least 2.0.

2. The defoamer formulation of claim 1, wherein the silicone polyethers (B) are prepared from a mixture of two different kinds of polyethers of the formulae $$CH_2=CR^1-(CH_2)_aO(C_2H_4O)_b(C_3H_6O)_cR^1 \quad (Ib)$$

and $$CH_2=CR^1-(CH_2)_aO(C_3H_6O)_cR^1 \quad (Ic).$$

3. The defoamer formulation of claim 2, wherein silicone polyethers (B) are prepared from a mixture of two different polyethers of formulae (Ib) and (Ic), wherein the fraction of ethyleneoxy units from the polyethers of the formulae (Ib) and (Ic), relative to the total number of alkyleneoxy units, is not more than 50 mol %.

4. The defoamer formulation of claim 2, wherein silicone polyethers (B) are prepared from a mixture of two different polyethers of formulae (Ib) and (Ic), wherein the fraction of ethyleneoxy units from the polyethers of the formulae (Ib) and (Ic), relative to the total number of alkyleneoxy units, is not more than 40 mol %.

5. The defoamer formulation of claim 2, wherein silicone polyethers (B) are prepared from a mixture of two different polyethers of formulae (Ib) and (Ic), wherein the fraction of ethyleneoxy units from the polyethers of the formulae (Ib) and (Ic), relative to the total number of alkyleneoxy units, is not more than 30 mol %.

6. The defoamer formulations of claim 1, wherein organopolysiloxanes (1) are of the formula $$H_hR_{3-h}SiO(SiR_2O)_o(SiRHO)_pSiR_{3-h}H_h \quad (III)$$

where

R are identical or different and are SiC-bonded monovalent hydrocarbon radicals having 1 to 18 carbon atoms free from aliphatic carbon-carbon multiple bonds, h is 0, 1 or 2, o is 0 or an integer from 1 to 1000, and p is 0 or an integer from 1 to 40, with the proviso that at least 2 Si-bonded hydrogen atoms are present.

7. The defoamer formulations of claim 1, wherein organopolysiloxanes (1) are of the formula $$H_hR_{3-h}SiO(SiR_2O)_o(SiRHO)_pSiR_{3-h}H_h \quad (III)$$

where

R is a methyl radical, h is 0 or 1, o is 0 or an integer from 10 to 200, and p is 0 or an integer from 2 to 20, with the proviso that at least 2 Si-bonded hydrogen atoms are present.

8. The defoamer formulation of claim 1, wherein silicone polyethers (B) are organopolysiloxanes which comprise polyether radicals A of the formulae $$-CH_2-CR^1-(CH_2)_aO(C_2H_4O)_bR^1 \quad (VIIa),$$

$$-CH_2-CR^1-(CH_2)_aO(C_2H_4O)_b(C_3H_6O)_cR^1 \quad (VIIb),$$

$$-CH_2-CR^1-(CH_2)_aO(C_3H_6O)_cR^1 \quad (VIIc),$$

with the proviso that at least 2 different kinds of polyether radicals A among the formulae (VIIa), (VIIb) and (VIIc) are present.

9. The defoamer composition of claim 1, wherein the silicone polyethers (B) comprise an organopolysiloxane of the formula $$A_zR_{3-z}SiO(SiR_2O)_m(SiRAO)_nSiR_{3-z}A_z \quad (VIII)$$

where

A is a polyether radical of the formulae $$-CH_2-CR^1-(CH_2)_aO(C_2H_4O)_bR^1 \quad (VIIa),$$

$$-CH_2-CR^1-(CH_2)_aO(C_2H_4O)_b(C_3H_6O)_cR^1 \quad (VIIb),$$

$$-CH_2-CR^1-(CH_2)_aO(C_3H_6O)_cR^1 \quad (VIIc),$$

R is a hydrogen atom or a monovalent hydrocarbon radical having 1 to 18 carbon atoms free from aliphatic carbon-carbon multiple bonds, $R^1$ is a hydrogen atom or a hydrocarbon radical having 1 to 6 carbon atoms, z is 0, 1 or 2, m is 0 or an integer from 1 to 1000, and n is 0 or an integer from 1 to 50, with the proviso that at least 2 different kinds of polyether radicals A from the group of the formulae (VIIa), (VIIb) and (VIIc) are present.

10. The defoamer formulation of claim 8, wherein silicone polyethers (B) are organopolysiloxanes which comprise two different kinds of polyether radicals A of the formulae $$-CH_2-CR^1-(CH_2)_aO(C_2H_4O)_b(C_3H_6O)_cR^1 \quad (VIIb)$$

and $$-CH_2-CR^1-(CH_2)_aO(C_3H_6O)_cR^1 \quad (VIIc).$$

11. The defoamer formulation of claim 9, wherein silicone polyethers (B) are organopolysiloxanes which comprise two different kinds of polyether radicals A of the formulae $$-CH_2-CR^1-(CH_2)_aO(C_2H_4O)_b(C_3H_6O)_cR^1 \quad (VIIb)$$

and $$-CH_2-CR^1-(CH_2)_aO(C_3H_6O)_cR^1 \quad (VIIc).$$

12. The defoamer formulation of claim 10, wherein silicone polyethers (B) are organopolysiloxanes which comprise polyether radicals A of the formulae (VIIb) and (VIIc), the fraction of ethyleneoxy units in the polyether radicals of the formulae (VIIb) and (VIIc), relative to the total number of alkyleneoxy units being not more than 50 mol %.

13. The defoamer formulation of claim 1, wherein silicone polyethers (B) are in the form of aqueous emulsions or microemulsions.

14. The defoamer formulation of claim 1, comprising (A) 1% to 90% by weight of siloxane-based antifoams, (B) 0.1% to 50% by weight of the silicone polyether of claim 1, (C) 0% to 20% by weight of emulsifiers, (D) 0% to 97% by weight of water, based in each case on the total weight of the defoamer formulation, and optionally (E) preservatives, thickeners and further additions.

15. The defoamer formulation of claim 1, which are emulsions and comprise
(A) 5% to 50% by weight of siloxane-based antifoams,
(B) 0.1% to 30% by weight of the silicone polyether of claim 1,
(C) 2% to 20% by weight of an emulsifier,
(D) 50% to 95% by weight of water,
based in each case on the total weight of the defoamer formulation, and optionally
(E) preservatives, thickeners and further additions.

16. The defoamer formulation of claim 1, wherein a mixture of silica and polyorganosiloxanes is used as siloxane-based antifoam (A).

17. The defoamer formulation of claim 1, wherein silicone polyethers (B) are emulsified together with the antifoam (A), or, after the preparation of an emulsion from the antifoam (A), the silicone polyethers (B) are added to the antifoam emulsion directly or in the form of an emulsion.

18. A process for defoaming aqueous media arising in pulp production, comprising adding a defoamer formulation of claim 1.

19. Silicone polyethers (B) prepared by
in a first step,
reacting organopolysiloxanes (1) containing from 0.05% to 1.6% by weight of Si-bonded hydrogen atoms
with unsaturated polyethers (3) selected from the group consisting of the formulae:

$$CH_2=CR^1-(CH_2)_aO(C_2H_4O)_bR^1 \qquad (Ia)$$

$$CH_2=CR^1-(CH_2)_aO(C_2H_4O)_b(C_3H_6O)_cR^1 \qquad (Ib)$$

$$CH_2=CR^1-(CH_2)_aO(C_3H_6O)_cR^1 \qquad (Ic),$$

where
$R^1$ is a hydrogen atom or a hydrocarbon radical having 1 to 6 carbon atoms,
a is 0 or an integer from 1 to 16,
b is an integer from 1 to 50, and
c is an integer from 1 to 50,
with the proviso that the sum of b+c is at least 10 and that a mixture of at least two different kinds of polyethers from the group of the formulae (Ia), (Ib) and (Ic) are used, and with the further proviso that the reaction takes place with a ratio of about 0.2 to 0.7 gram atoms of Si-bonded hydrogen per mol of aliphatic double bonds in the unsaturated polyethers,
and in a second step,
further reacting the reaction product from (1) and (3)
with organopolysiloxanes (2) containing from 0.01% to 0.5% by weight of Si-bonded hydrogen atoms,
with the proviso that the reactions in the first and second steps are carried out in the presence of catalysts (4) which promote the addition of Si-bonded hydrogen to aliphatic double bonds, and
that the ratio of the weight concentration of Si-bonded hydrogen in organopolysiloxane (1) to the weight concentration of Si-bonded hydrogen in organopolysiloxane (2) is at least 2.0.

* * * * *